Nov. 12, 1968 A. M. COHEN ET AL 3,410,088
FLUID CONTROL SYSTEM
Filed June 6, 1966
7 Sheets-Sheet 1
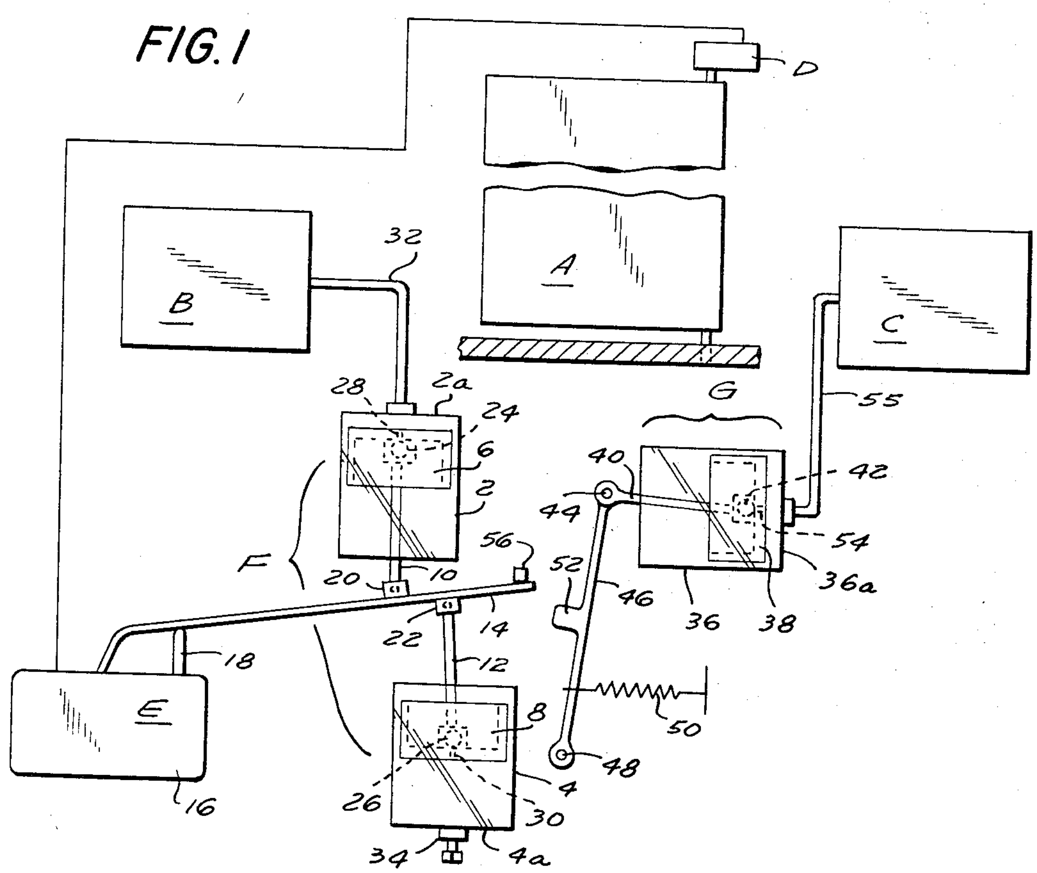
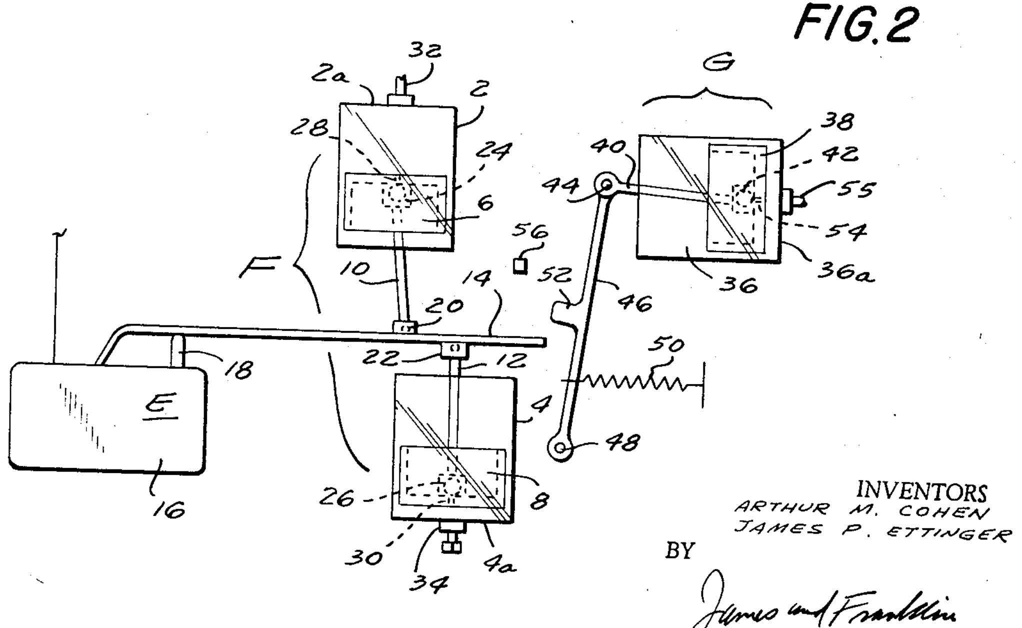
INVENTORS
ARTHUR M. COHEN
JAMES P. ETTINGER
BY
James and Franklin
ATTORNEY FLUID CONTROL SYSTEM
Filed June 6, 1966
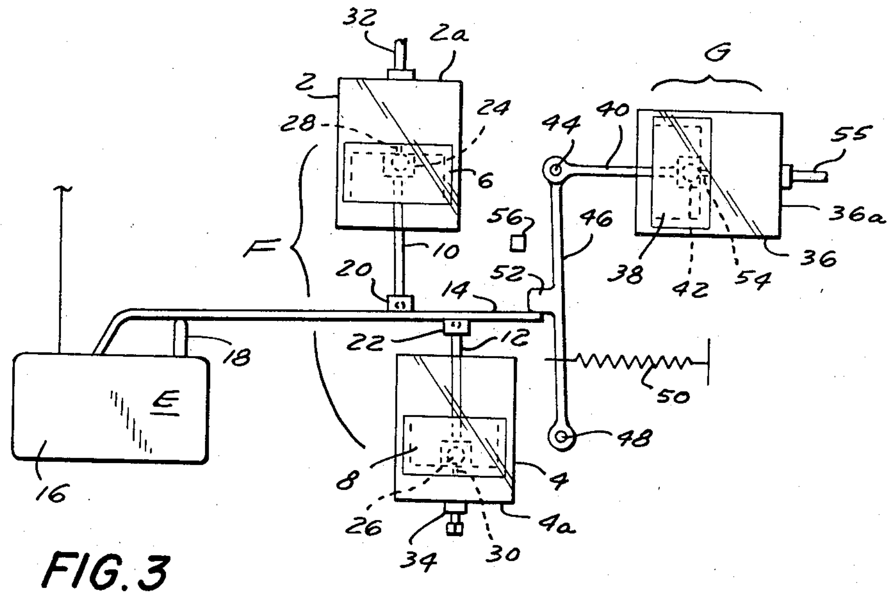
FIG. 3
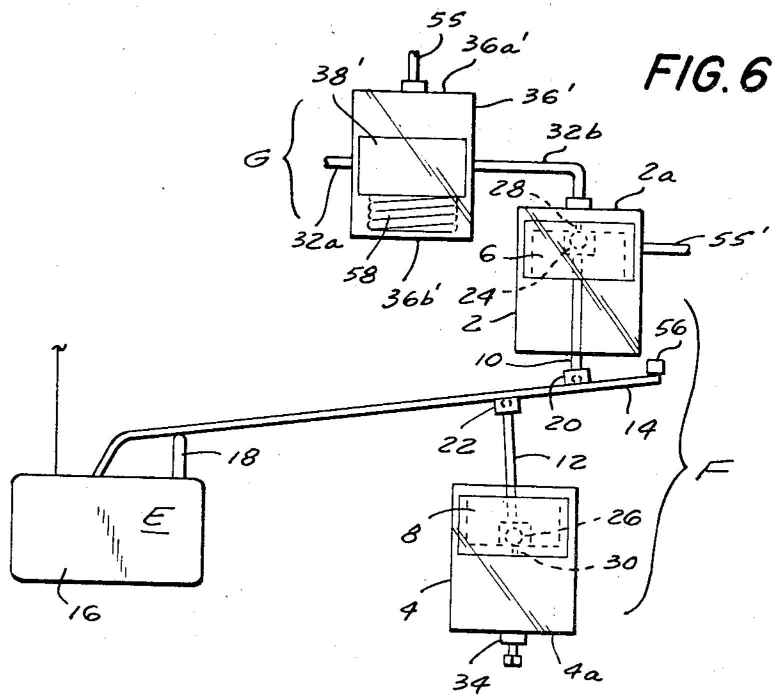
INVENTORS
ARTHUR M. COHEN
JAMES P. ETTINGER
BY
James and Franklin
ATTORNEY

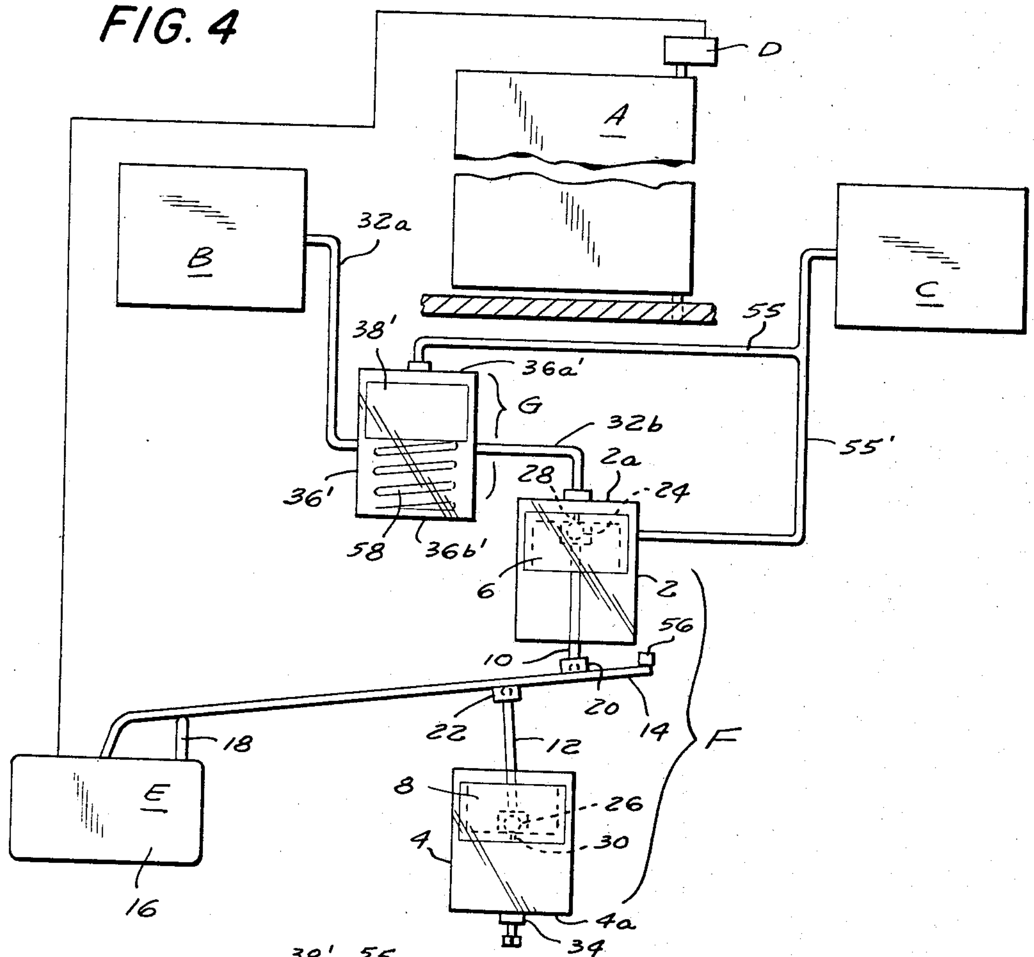
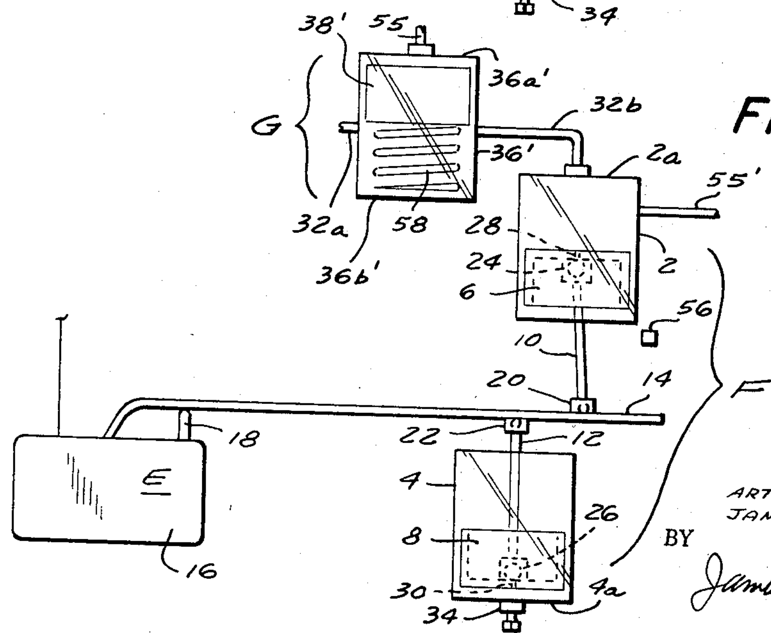
INVENTORS
ARTHUR M. COHEN
JAMES P. ETTINGER
BY James and Franklin
ATTORNEY

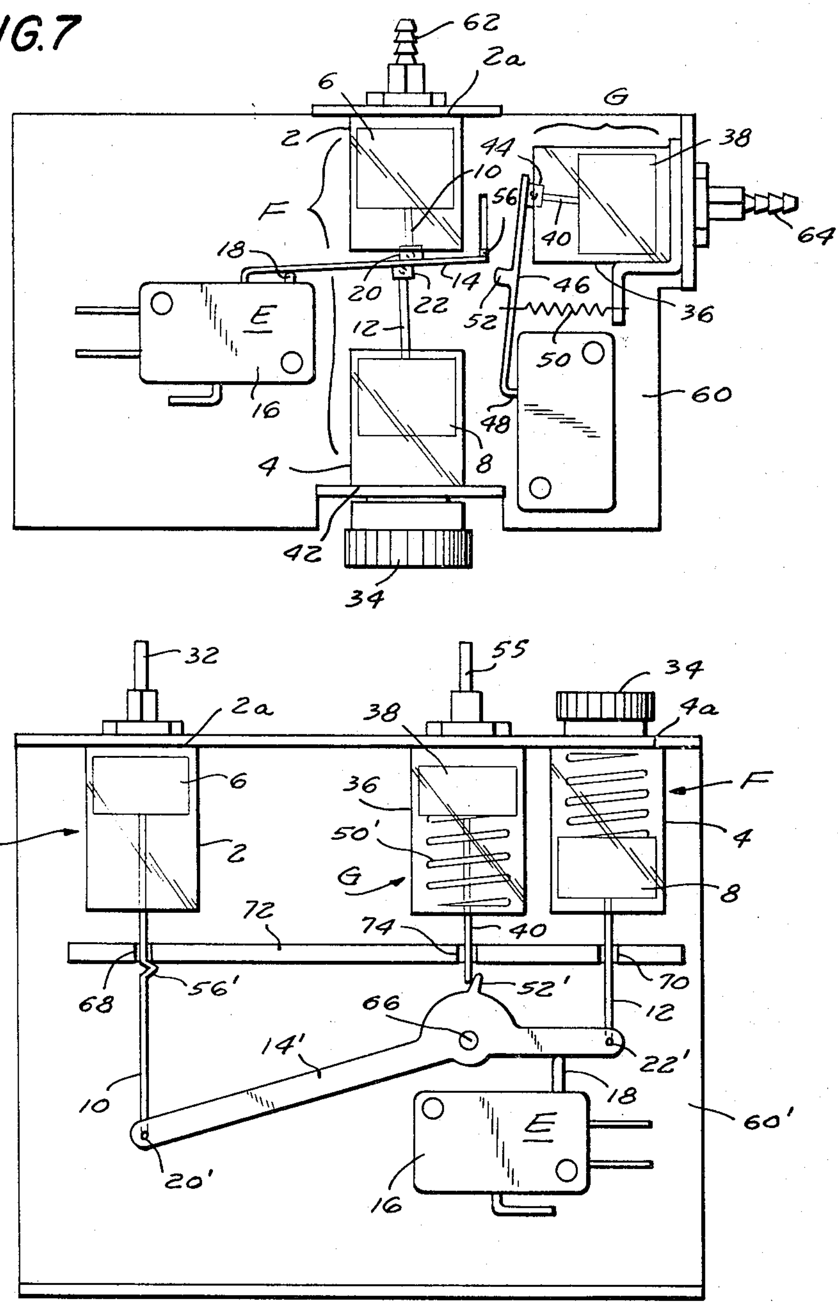
INVENTORS
ARTHUR M. COHEN
JAMES P. ETTINGER
BY
James and Franklin
ATTORNEY FLUID CONTROL SYSTEM
Filed June 6, 1966 7 Sheets-Sheet 5
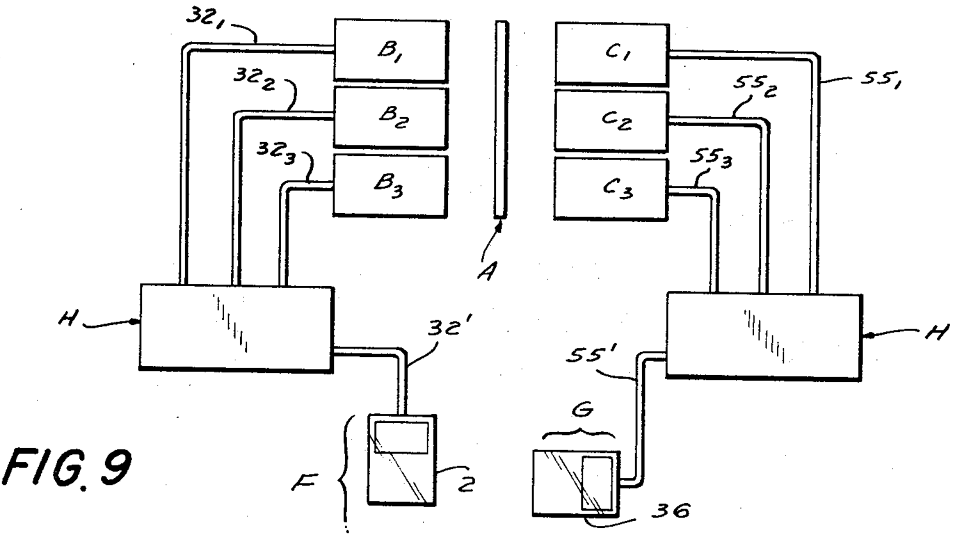
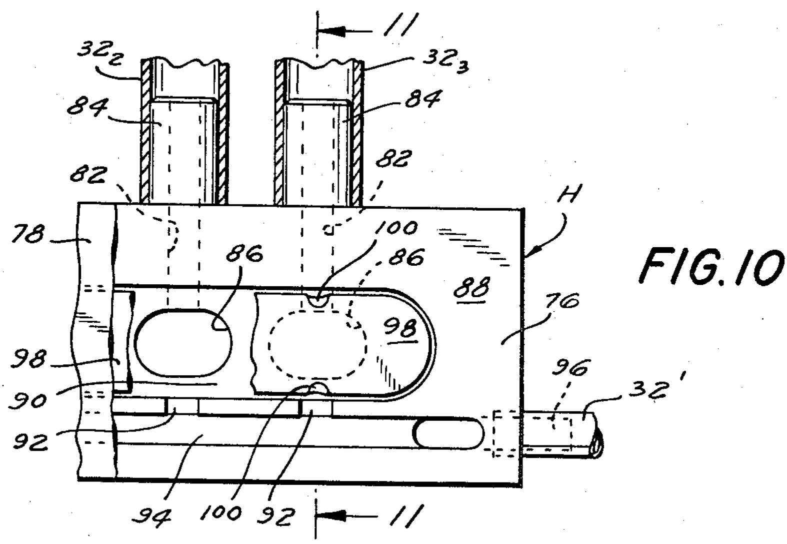
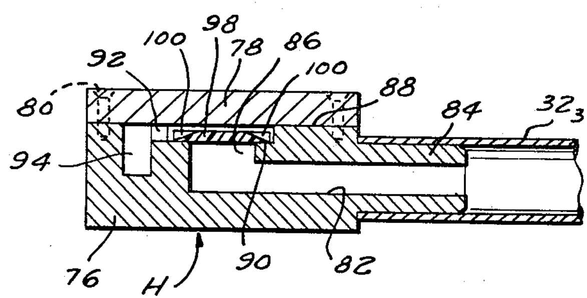
INVENTORS
ARTHUR M. COHEN
JAMES P. ETTINGER
BY
James and Franklin
ATTORNEY FIG. 12
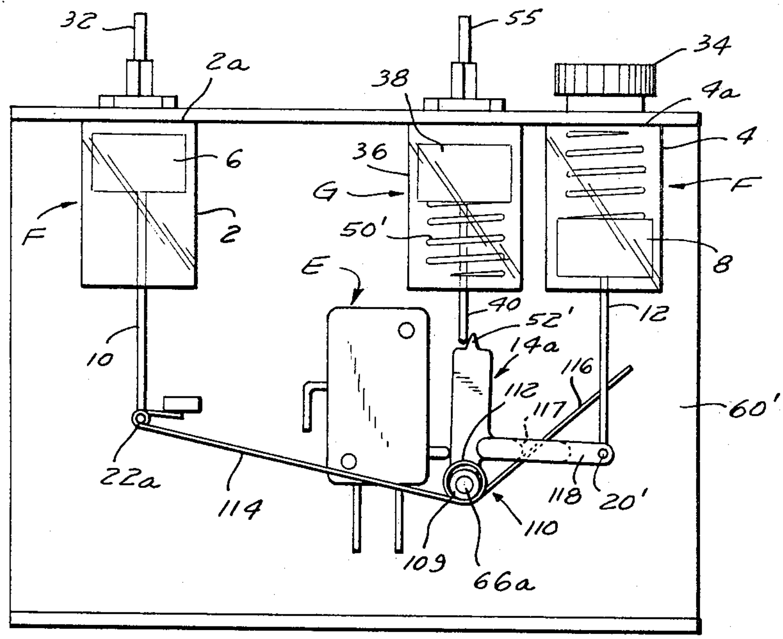
FIG. 13
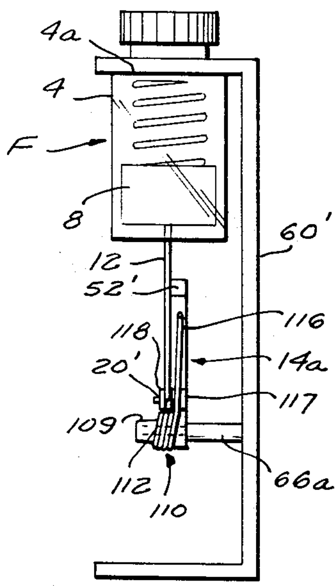
FIG. 14
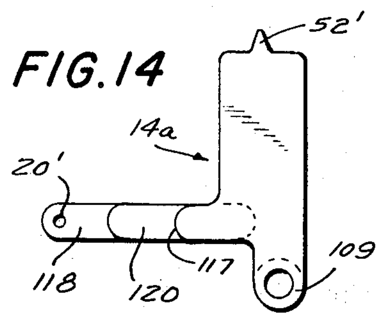
FIG. 15
INVENTORS
ARTHUR M. COHEN
JAMES P. ETTINGER
BY James and Franklin
ATTORNEY FIG. 16
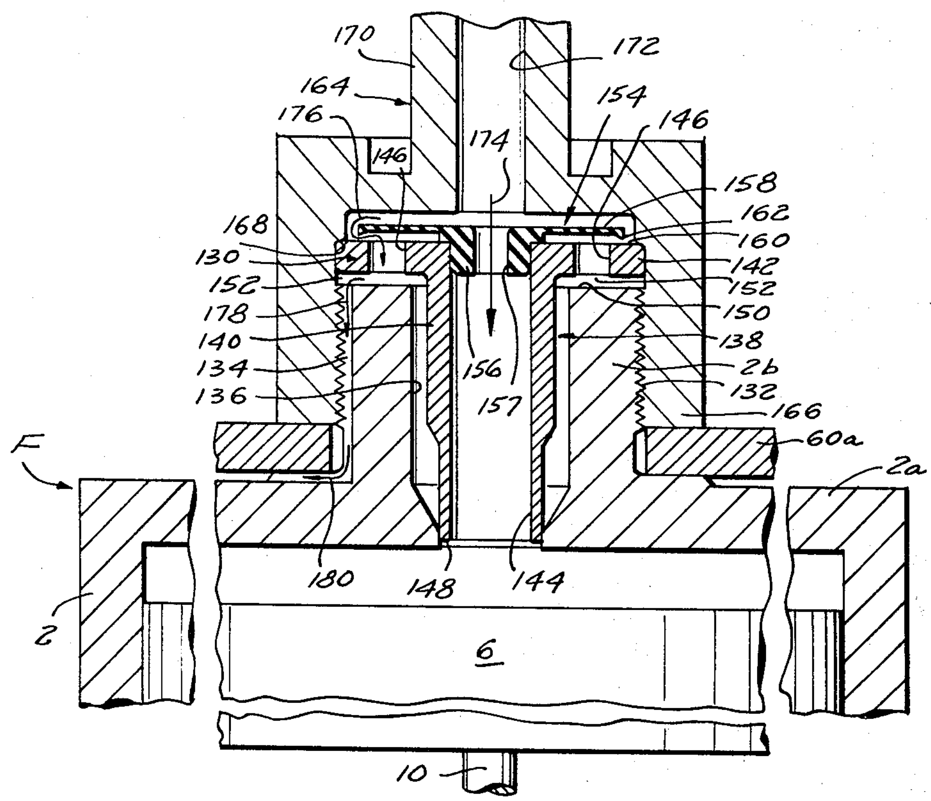
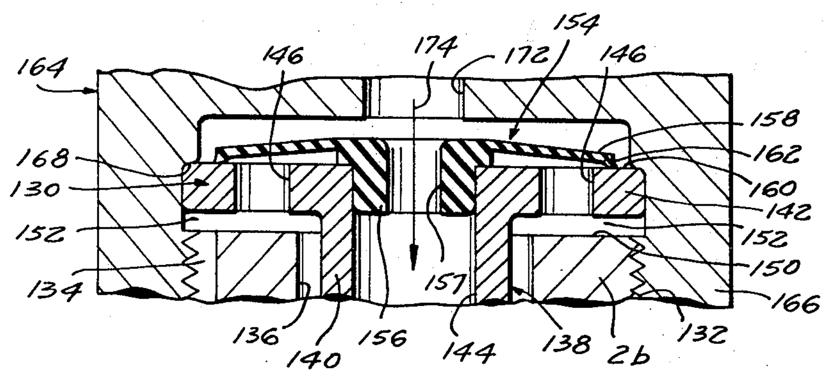
FIG. 17
INVENTORS
ARTHUR M. COHEN
JAMES P. ETTINGER
BY James and Franklin
ATTORNEY United States Patent Office 3,410,088

Patented Nov. 12, 1968

3,410,088
FLUID CONTROL SYSTEM

Arthur M. Cohen, Westport, and James P. Ettinger, Ridgefield, Conn., assignors to Electric Regulator Corporation, Norwalk, Conn., a corporation of New York Filed June 6, 1966, Ser. No. 555,449
33 Claims. (Cl. 60—54.5)

ABSTRACT OF THE DISCLOSURE

A system is provided for controlling the opening and closing of doors in response to pressure exerted on mats provided on both sides of the doors, which system is actuated entirely by fluid pressure. Pressure exerted on the entry mat causes a first part to move to cause the door to open, and pressure exerted on the exit mat operatively acts upon that part so as to prevent its further operative movement, thereby to prevent the door from opening when it is closed or closing when it is opened as long as someone is standing on the exit mat. The pressure-sensitive controlling action exerted by the exit mat is operative either mechanically on the part moved by the entry mat or in a fluid-control fashion on the fluid system which moves that first part. Means are provided for enabling any one of a plurality of entry mats or exit mats to control the operation of the system, and the fluid pressure system is designed to minimize the effects of ambient temperature change or sudden release of pressure from the mats.

The present invention relates to a system for controlling the operation of an external device in accordance with the sensing of pressures in a fluid system. The present invention is particularly well adapted, and is here specifically disclosed, for use in automatically controlling the opening and closing of doors in accordance with the presence or absence of persons adjacent the doorways.

The usual system for controlling the operation of automatic swinging doors comprises a pair of mats, one on the entry side and the other on the exit side of the door. The weight of a person on the entry mat causes the door to open, the door remaining open for a sufficient period of time to permit the person to pass through the door and step onto the exit mat. Thereafter, as long as a person is on the exit mat the door will remain open, since if the door were to close it would perhaps injure the person on the exit mat. It is only after the person steps off the exit mat that the door is permitted to close. Also, if, while the door is closed, a person should be standing on the exit mat and another person should step onto the entry mat, the door will not open, since if it did it would perhaps injure the person standing on the exit mat. For sliding doors exit mat control is not needed, but an entry mat is employed to initiate the door opening operation. These operating characteristics are presently accomplished in the field through electric means, the mats comprising normally separated electrical contacts which, when pressure is placed on the mat, are brought into contact with one another, thereby to close an electrical circuit and actuate suitable control instrumentalities such as electromagnets, relays and the like.

A major problem involved in these prior art electrical systems, whether for entry control alone, or for entry control together with exit safety control, revolves about the fact that the mats must be placed on the floor, where water and other deleterious substances tend to accumulate, particularly when the mats are located outdoors, as when they control the operation of entry doors into a store. The adverse effect of water or moisture on electrical contacts and connections needs no elaboration. Attempts have been made to solve this problem by sealing the mat above the contact elements, but these attempts have proved to be quite costly, and wholly undependable. Contributing to the costliness is the fact that the material of which the mats are formed must not only have sealing and elastic properties, but must also be an excellent electrical insulator. In addition, problems have arisen in constructing the mats so that they will be effective no matter where over their surface pressure is applied. Also, because of the existence of contact strips in these electrical mats, they are substantially rigid, thus presenting shipping problems.

It is the prime object of the present invention to devise a control system which will be fully as effective functionally as the existing electrical systems but which will operate on a fluid basis rather than on an electrical basis. While either hydraulic or pneumatic means could be employed in this system, it is thought that pneumatic means are less expensive and more adaptable, and the invention is therefore here specifically disclosed as entirely pneumatic in character. The use of a fluid control system rather than an electrical control system essentially avoids the problems and drawbacks described above. In particular the systems are essentially operatively insensitive to the effects of temperature and moisture, they may be manufactured, shipped and installed much more inexpensively and conveniently than the electrical control mats of the prior art, they function more reliably than known electrical control mats, and they will function to cope with the operational problems involved in a manner at least as satisfactory as with electrical control systems, but in a more reliable and less costly manner.

Moreover, means are provided for causing the system to function in conjunction with a plurality of pressure source units such as mats either at the entry or at the exit or both, the production of pressure at any of those units being effective to operatively actuate the control system.

To the above ends, the entry pressure source (mat) is in fluid communication with a piston-cylinder assembly and is effective, when pressure is developed therein, to cause the piston of that assembly to move from its normal position, thereby to actuate a switch or the like and cause the controlled device to do what is required, e.g., to cause the door to open. The piston is capable of thus moving rapidly and it will, under normal conditions, remain in its actuated position as long as pressure continues to be exerted from the pressure source. Once that pressure is released, as when the person passes through the door and steps off of the entry mat, the piston will return slowly toward its initial position, thus giving the person passing through the doorway time to actuate the exit pressure source (mat) before the switch controlled by the piston has opened. The exit source is fluid-connected to a second piston-cylinder assembly, and when pressure is developed in that exit source the second piston-cylinder assembly is actuated to cause its piston to move, that piston in turn preventing the piston of the first assembly from moving toward its initial position sufficiently to open the switch to the controlled device. Thus the door will remain open for as long as the exit source remains actuated. When the person steps off the exit mat the exit source becomes deactuated, the piston of the second assembly returns to its normal position, it releases the piston of the first assembly and permits it to move to its normal position, the switch opens, and the door closes. If pressure is developed by the exit source at the time that the entry source is actuated nothing will happen—the pressure developed from the exit source will actuate the piston of the second assembly, thereby to prevent the piston of the first assembly from moving sufficiently toward its actuated position so as to close the control switch.

The action of the second assembly on the first assembly can be of various types. Mechanical action—physical engagement of two parts—and fluid action—the control of operative fluid connections—are here specifically disclosed.

For permitting actuation of the system from any one of a plurality of individual pressure source units, each of the units is individually connected to a manifold through a simplified valve means defined by a plastic strip, the valve means functioning to cause the pressure developed in any one of the units to be exerted on the appropriate piston-cylinder assembly and also being so constructed as to permit the excessive pressures in the fluid system, should they develop, to vent themselves, thus rendering the system ready for subsequent actuations.

Means are also provided for overcoming any deleterious effects which might tend to result from excessive control pressures or from the development of appreciable negative pressures in the mats.

As has been noted, the invention is here specifically disclosed as embodied in a door control system. It is, however, capable of many other uses, and constitutes a basic transducer system for translating pressure or displacement into amplified mechanical action. Purely by way of example, it can be used to produce appropriate signals derived from automobile traffic at gas stations and other drive-in operations, it can be used to operate switches of other electrical or mechanical devices from the vacuum columns used in computer tape transports, it can be used for sensing pressure changes or changes of flow in pipes to produce signals such as are provided in fire sprinkler systems, it can be used for sensing liquid levels or vessel pressure changes, it can be used to sense heat changes through the action of rate of change of volume or changes of pressure in a contained air system, thereby to provide fire alarms, and it can be used not only to control an automatic door operator in response to persons stepping upon mats on the floor but also to control such operations in response to safety switches provided on the edges of the doors themselves which are designed to sense the contact of the door with an obstruction.

To the accomplishment of the above, and to such other objects as may hereinafter appear, the present invention relates to a fluid control system as defined in the appended claims and as described in this specification, taken together with the accompanying drawings, in which:

FIG. 1 is a schematic view of a first embodiment of the present invention, utilizing a mechanical operative connection between the exit and entry source systems, the system of FIG. 1 being shown in its standby position, with no pressure exerted from either the entry or the exit source;

FIG. 2 is a fragmentary view of the system of FIG. 1 showing the position which the parts assume when pressure is exerted on the entry source but not on the exit source;

FIG. 3 is a view similar to FIG. 2 but showing the position which the parts assume when pressure is exerted on the exit source and pressure is released from the entry source;

FIG. 4 is a schematic view of a second embodiment of the present invention, utilizing a fluid operative connection between the exit and entry source systems, the system of FIG. 4 being shown in standby position;

FIG. 5 is a fragmentary view of the system of FIG. 4 showing the position which the parts assume when pressure is exerted on the entry source but not on the exit source;

FIG. 6 is a view similar to FIG. 5 but illustrating the position which the parts assume when pressure is exerted on the entry source after pressure has been exerted on the exit source and while the exit source pressure continues to exist;

FIG. 7 is a plan view of a first embodiment of a mechanical arrangement for a control system corresponding to that of FIG. 1;

FIG. 8 is a top plan view of an alternative mechanical embodiment of the system of FIG. 1;

FIG. 9 is a schematic view of an embodiment in which a plurality of independent fluid sources are provided for actuation of one of the piston-cylinder assemblies;

FIG. 10 is a fragmentary top plan view of the manifold structure used in the embodiment of FIG. 9, that structure being shown with its cover removed;

FIG. 11 is a cross sectional view of the covered manifold unit, taken along the line 11—11 of FIG. 10;

FIG. 12 is a view similar to FIG. 8 but showing an alternative mechanical embodiment;

FIG. 13 is a fragmentary side elevational view of a portion of the embodiment of FIG. 12;

FIG. 14 is a top plan view of the movable arm in the embodiment of FIG. 12;

FIG. 15 is a front elevational view of the arm of FIG. 14;

FIG. 16 is a cross sectional view, partially broken away and on an enlarged scale, of a valve arrangement for effectively eliminating effects of slow temperature change or the like, the valve being shown in its operative position corresponding to slight or slow pressure change; and FIG. 17 is a fragmentary view similar to FIG. 16, but showing the valve in its operative position corresponding to a great or rapid pressure change.

The embodiment of FIGS. 1–3 represents a system designed for operating a door A in response to the existence or absence of pressure at a pair of fluid sources B and C comprising entry and exit sources respectively, movement of the door A between open and closed position being accomplished by a motor D the operation of which is controlled by switch E. Automatic door operating systems are well known and take a wide variety of forms. They form no part of the present invention, and hence will not be here described in any detail, other than to comment that the motor D may be electrical, hydraulic or pneumatic, and switch E may likewise be electrical, hydraulic or pneumatic, all as is well known in the automatic door operator art. The fluid sources B and C may also take a wide variety of forms, provided only that they are capable, when appropriately manipulated, to produce fluid pressures. They could be manually operated bellows or telescopable tubes located for example, on the wall near a door where they could be pressed by a person desiring the door to open or close, but they are most commonly in the form of mats or treadles disposed in the floor adjacent the door. The specific structure of these mats also forms no part of the present invention, and the term "mat" is here used generically to encompass any hollow structure designed to be stepped on or rolled over, be it plate-like or tube-like in configuration. The operative characteristic of the sources B and C, when used as "mats," is that when weight is placed thereon, as by someone stepping on them, they are compressed and a pressure is developed within them, the "mats" being capable of expanding to their normal condition when weight is removed therefrom.

The entry mat B is operatively connected to first pressure-sensitive assembly generally designated F which comprises a pair of containers such as cylinders 2 and 4 having end walls 2$a$ and 4$a$, respectively. Movable parts such as pistons 6 and 8 are snugly slidable within the cylinders 2 and 4 respectively so as to be movable toward and away from the end walls 2$a$ and 4$a$, respectively. Piston rods 10 and 12 are connected to the pistons 6 and 8 respectively, they extend out beyond the cylinders 2 and 4, respectively, and they are each connected to an arm 14 which is pivotally mounted on the casing 16 of the switch E and which engages the actuating button 18 for the switch E. That actuating button 18 is resiliently urged upwardly as shown in FIG. 1 by resilient means (not shown) enclosed within the switch casing 16, thereby causing the arm 14 to pivot in a counter-clockwise direction, raising the pistons 6 and 8 and causing the piston 6 to move toward its associated cylinder end wall 2$a$ while causing the piston 8 to move away from its associated cylinder end wall *4a*. The piston rods 10 and 12 are preferably connected to the arm 14 by ball and socket joints 20 and 22, respectively, and they are also preferably connected to their respective pistons 6 and 8 by ball joints 24 and 26, respectively. The ball joint 26, and also preferably the ball joint 24, may take the form shown in Wilcox Patent 3,175,646 of Mar. 30, 1965, entitled "Joint for Piston-Piston Rod Combination and Valve Function Thereof," which patent is assigned to the assignee of this application. As disclosed in that patent, the pistons 6 and 8 are provided with bypass passages 28 and 30 respectively which are closed or opened depending upon the relative directions in which the corresponding pistons and piston rods are urged. The ball joint 24 for the piston 6 has the characteristic of closing the bypass passage 28 when the piston 6 and piston rod 10 are pushed against one another and of opening the bypass passage 28 when the piston 6 and piston rod 10 are pulled away from one another, thus corresponding in essence to the embodiment of FIG. 3 in Wilcox Patent 3,175,646. The ball joint 26 for the piston 8 is oppositely operative; it opens the bypass passage 30 when the piston 8 and piston rod 12 are pushed against one another, and it closes the bypass passage 30 when the piston 8 and piston rod 12 are pulled against one another, thereby corresponding in essence to the embodiment of FIG. 4 in Wilcox Patent 3,175,646.

A pipe or tube 32 provides fluid communication between the fluid source B and the interior of the cylinder 2, the pipe 32 passing through the cylinder end wall *2a*. An adjustable leakage valve 34 passes through the end wall *4a* of cylinder 4.

The second or exit fluid source C is operatively associated with a second pressure-sensitive assembly generally designated G. This comprises a container such as cylinder 36 having an end wall *36a*, within which cylinder a movable part such as piston 38 sealingly slides. The piston is provided with a piston rod 40 connected to the piston 38 by ball joint 42 and pivotally connected at its outer end 44 to an arm 46 which is in turn pivotally mounted at 48 and to which a biasing spring 50 is connected, that spring being active to cause the arm 46 to pivot in a clockwise direction as viewed in FIG. 1, thereby causing the piston 38 to move to the right toward the cylinder end wall *36a*. The arm 46 has a protruding part 52 which, when the arm 46 is in its normal clockwise rotated position, is outside the path of travel of the cam 14 (see FIGS. 1 and 2), but which when the arm 46 is rotated in a counter-clockwise direction, as shown in FIG. 3, interrupts the path of travel of the arm 14 and thus is adapted to be engaged by the tip of the arm 14. The ball joint 42 between the cylinder 36 and the piston rod 40 may be of the same type as the ball joint 24 for the piston 6, that is to say, the piston 36 may be provided with a bypass passage 54, the ball joint closing that passage 54 when the piston 38 and piston rod 40 are pushed against one another and opening the bypass passage 54 when the piston 38 and the piston rod 40 are pulled against one another. A pipe or tube 55 provides fluid communication between the fluid source C and the interior of the cylinder 36, the pipe 55 passing through the cylinder end wall *36a*.

The operation of this system is as follows: Under normal conditions, as shown in FIG. 1, the spring within the switch casing 16 urges the pistons 6 and 8 upwardly, and biasing spring 50 moves the piston 38 to the right. When the arm 14 is raised, as it will be under those circumstances, the switch E is opened or otherwise appropriately actuated so as to cause the motor D to close the door A. If now a person steps on or otherwise actuates the source or mat B, that mat will be compressed, pressure will be developed thereby, and that pressure will be applied within the cylinder 2 above the piston 6, forcing that piston down (see FIG. 2), the bypass passage 28 through the piston 6 being closed because of the push exerted on the piston 6. This will move the arm 14 and the piston 8 downwardly, the piston 8 moving freely downwardly because the push exerted thereon by its rod 12 is effective to open the bypass 30. The arm 14 will therefore move rapidly down, depressing the spring plunger 18 and closing or otherwise actuating the switch E so as to cause the motor D to open the door A. This situation will continue for as long as pressure is produced by the source B, whether by the first individual remaining thereon or by other individuals stepping thereon as the first individual steps off therefrom.

When the source B is no longer actuated it will expand, the pressure formerly developed thereby will disappear, and the spring within the switch casing 16 will then be effective to cause the arm 14 to rise. This will tend to move the piston 6 upwardly, and will also pull the rod 12 against the piston 8. That pull will close the bypass 30, and the piston 8 will thus resist upward movement. The degree to which it will resist upward movement is controlled by adjustment of the leakage valve 34 in known fashion. Thus the arm 14 will move upward slowly, at a rate such as to provide a time delay of predetermined duration between the removal of pressure from the source B and the actuation of the switch E so as to cause the motor D to close the door A.

During this predetermined time delay, if the individual who initially stepped on the mat B passes through the opened doorway, he will step onto the exit mat C, thus developing a pressure therein which causes the piston 38 to move to the left against the action of the spring 50 to the position shown in FIG. 3. In this position the part 52 has moved into the path of travel of the tip of the arm 14 and is engaged by the arm 14 as the latter rises, that engagement being at a point such that the switch E has not yet been actuated to cause the door A to close. Thus, for as long as a person stands on the exit mat C, the door A will remain open. When pressure is released from mat C the piston 38 will be permitted to return to its FIG. 1 position, the projection 52 will be removed from the path of travel of the arm 14, and the arm 14 will be released for further upward movement, under the influence of spring within the switch case 16, unless in the interim someone has stepped on mat B and thus produced fluid pressure which has forced the pistons 6 and 8 back down to their position of FIG. 2.

If, with the parts in their condition shown in FIG. 1, a person or an object were to be on the exit mat C, the piston 38 would be moved to the left and the part 52 would be in the path of travel of the arm 14, although this time below the tip of that arm rather than above it as previously discussed and as shown in FIG. 3. Under these circumstances if a person is now to step on entry mat B, the piston 6 will be moved downwardly, moving the arm 14 down, but that movement will be positively interrupted by the part 52 before the arm 14 has moved downward sufficiently to actuate the switch E so as to cause the motor D to open the door A. Thus the door will not open, and injury or damage to the person or thing on the exit mat C will be prevented.

It sometimes happens, particularly when a large number of people simultaneously stand on mat B and then step off therefrom, that a vacuum or reduction of pressure below normal might exist within the fluid system of which the source B is a part. If that situation were permitted to continue for any appreciable period of time, the next person to step on the mat B might not develop enough pressure to force the pistons 6 and 8 down. It is to eliminate this that the one-way damping provided by the bypass 28 and ball joint 24 in piston 6 is provided, this functioning in conjunction with a positive stop 56 which is effective to limit the upward movement of the piston rod 10 at a point where some additional upward movement of the piston 6 within the cylinder 2 is still possible. If, after the piston rod 10 has moved upwardly as far as it is permitted to go, any appreciable suction or reduction of pressure exists in the fluid system above the piston 6, that piston will be pulled away from the piston rod 10, the bypass 28 will be opened, and the suction will be relieved.

The embodiment of FIGS. 4–6 is essentially the same as that of FIGS. 1–3, except that the interaction between the second piston-cylinder assembly G controlled by the exit mat C and first piston-cylinder assembly F controlled by the entry mat B is effected by controlling the fluid system active on the first assembly F rather than by mechanically controlling the movement of the parts of the assembly F, as in the embodiment of FIGS. 1–3. Thus, in the embodiment of FIGS. 4–6 the second piston-cylinder assembly G is operatively interposed within the pipe or tube 32 between the first or entry source B and the cylinder 2, there to function as a fluid valve. As here specifically disclosed the cylinder 36′ is closed at both ends, having end walls 36a′ and 36b′. The piston 38′ is normally urged upwardly toward the end wall 36a′ by means of spring 58 housed within the cylinder 36′. The fluid communication means 32 between the source B and the cylinder 2 is in two parts 32a and 32b which pass through the side wall of the cylinder 36′ at points normally beneath the piston 38′, which points communicate with one another through the interior of the cylinder 36′. When pressure is produced within the source C, the piston 38′ is moved down against the action of the spring 58, and in so moving it covers the ends of the pipes 32a and 32b, interrupting fluid communication therebetween and, in effect, acting as a closed valve. Thus, as shown in FIG. 6, if pressure is produced in the second source C when no pressure is produced in the first source B, fluid communication between the first source B and the cylinder 2 will be interrupted, and hence if someone steps on the mat B the door will not open, since the cylinder 6 will not be pushed downwardly and hence the arm 14 will not be moved downwardly. Similarly, if pressure is produced in the second source B while pressure is being produced in the first source B, a subsequent release of pressure in the first source B will not result in a moving upwardly of the pistons 6 and 8 and the arm 14, since the downwardly moved piston 38′ will maintain pressure within the cylinder 2 and thus prevent the piston 6 from moving upwardly.

In the embodiment of FIGS. 4–6 there is, in addition to the fluid connection means 55 between the second source C and the cylinder 36′ of the second assembly G, also a fluid connection 55′ between the second source C and the cylinder 2 of the first assembly F, this additional connection 55′ entering the cylinder 2 at a point along the side wall thereof located downwardly from the cylinder end wall 2a and in a position which is blocked by the piston 6 when the latter is in its normal upper position (see FIG. 4). The purpose of this additional fluid connection 55′ is to permit the second source C, when pressure is produced therein, to directly act upon the piston 6 to hold the latter down, thereby maintaining the door A open, this effect being in addition to that of the piston 38′ in preventing escape of the pressure developed within the cylinder 2 back to the source B. Because of the location of the end of the fluid connection 55′ down along the side of the cylinder 2, pressure developed in the source C will not be effective to move the piston 6 down from its normal up position; it will only be effective to hold the piston 6 down after it had previously been moved down by pressure developed from the first source B. Moreover, the location of the end of the connection means 55′, blocked by the piston 6 when the latter is in its upper position, prevents escape of the pressure emanating from the source B to the source C before that pressure has accomplished its designed purpose of moving the piston 6 down and causing the door A to open. In some instances it may be desirable to provide, in the fluid connection means 55, a one-way check valve preventing pressure flow toward the source C but permitting pressure flow from the source C, thereby to prevent dissipation of the pressure developed from the source B into the source C after the piston 6 has been moved downwardly sufficiently to expose the end of the fluid connection means 55′.

FIG. 7 represents a physical embodiment of the control system of FIGS. 1–3, the parts, to which numerals corresponding to those used in FIGS. 1–3 have been applied, being mounted on base plate 60, the cylinders 2 and 36 being provided with nipples 62 and 64 respectively to which the fluid connection means 32 and 55 are adapted to be connected. In the embodiment of FIG. 7 the positive stop 56 limiting upward movement of the arm 14 may be defined by an ear struck up from the base plate 60.

FIG. 8 discloses an alternative mechanical embodiment for the system of FIGS. 1–3, to the parts of which reference numerals corresponding to those used in FIGS. 1–3 and 7 have been applied where appropriate. In the embodiment of FIG. 8 the piston rods 10 and 12 are pivotally connected at points 20′ and 22′ to lever arm 14′ which is pivotally mounted on the base plate 60′ at 66, the right hand portion of the arm 14′ overlying and being engaged by the actuating button 18 of the switch E. The piston rods 10 and 12 pass through slots 68 and 70 respectively in an upstanding structural plate 72, the positive stop 56′ limiting upward movement of the piston rod 10 being defined by a lateral distortion of that rod 10 which will not pass through the slot 68. The biasing spring 50′ for the piston 38 of the cylinder 36 is housed in any appropriate manner within the cylinder 36, but the lower end of that cylinder is open to the atmosphere. The piston rod 40 passes through slot 74 in the plate 72 and is located in line with the path of movement of a projection 52′ on the arm 14′. The spring 50′ is active to lift the piston 38 and the piston rod 40 so that the latter is beyond the path of travel of he part 52′, but when pressure is produced in the second source C the piston 38 and piston rod 40 are moved downwardly, the tip of the latter moving into the path of travel of the part 52′, thereby positively preventing the rod 14′, when it is in its position shown in FIG. 8 in which the switch E is actuated to cause the door A to close, from pivoting in a counter-clockwise direction to actuate the switch E to cause the door A to open. Similarly, if the arm 14′ were pivoted to its counter-clockwise or door-opening position, the tip of the piston rod 40 would prevent the arm 14′ from swinging sufficiently in a clockwise direction to cause the door to close.

The desired mode of operation can readily and effectively be produced through the use of commercially available dashpot assemblies, which are sufficiently sensitive as to produce the desired actuations in response to rapid small increases in pressure, but which have a sufficient degree of leakage between piston and cylinder so that slow pressure changes such as result from changes in temperature will leak off without causing actuation of the controlled device.

The system as described above operates on the basis of an increase in pressure which is derived, in the case of a person stepping on a floor mat, by the consequent reduction in volume of the inner space of that mat. Where that reduction in volume constitutes an appreciable fraction of the total internal volume of the mat, a substantial increase in pressure will be produced thereby. The greater the volume of the mat compared with the change in volume produced by the feet of an individual, the less will be the pressure change produced by that individual. While the system here disclosed may be made quite sensitive to even very small pressure changes, it is desirable that the effective pressure changes be kept at a comparatively high value. This may prove to be difficult in certain applications where the area to be made pressure-sensitive is appreciably large, as, for example, where control of wide doors, such as might be employed in supermarkets or garages, is involved. In these instances it may be desirable, as indicated in FIG. 9, to employ, as the pressure sources B and/or C, a plurality of individual pressure source units designated $B_1$, $B_2$, $B_3$, etc., and/or a plurality of individual pressure source units $C_1$, $C_2$, $C_3$, etc. Actuation of any one of these units by a person stepping thereon should be effective to actuate the control system. To that end a series of individual fluid connections $32_1$, $32_2$, $32_3$, etc. or $55_1$, $55_2$, $55_3$, etc., extend between the individual units $B_1$, $B_2$, $B_3$, etc. or $C_1$, $C_2$, $C_3$, etc., as the case may be, and a manifold generally designated H. This manifold, as may best be seen from FIGS. 10 and 11, comprises a housing defined by a base portion 76 and a cover 78 secured thereon in any appropriate manner, as by screws 80. The base 76 is provided with a plurality of passages 82 extending respectively from outwardly projecting nipples 84 to upwardly extending ports 86. The individual fluid connections $32_1$, $32_2$, $32_3$, etc. are designed to be connected to individual nipples 84. The ports 86 terminate below the upper surface 88 of the base 76, there to define a ledge 90. Lateral passages 92 extend from the ledges 90 to a chamber 94 extending substantially the length of the base 76, and the end of the chamber 94 communicates with an outwardly extending nipple 96 to which an output tube 32' is adapted to be connected, that tube extending to the operative piston-cylinder assembly F or G. The ports 86 are aligned with and spaced from one another. Disposed on the surface 90, and covering all of the ports 86, is a thin flexible sheet 98 of plastic sealing material, such as that sold commercially under the trade name "Mylar." When the pressure on the upper surface of the sheet 98 is substantially equal to or somewhat greater than the pressure exerted at the ports 86, the plastic sheet 98 will seal those ports. When, however, pressure is developed in any one of the pressure source units $B_1$, $B_2$ or $B_3$ that pressure will be effective to lift the plastic sheet 98 from the corresponding port 86, but not from the other ports 86, thus permitting that pressure to be communicated to the chamber 94 and to the space above the remainder of the strip 98. Thus that pressure will be effective to pass through the connection means 32' to the appropriate piston-cylinder assembly F or G, as the case may be, and it will also be effective to press the plastic sheet 98 down against the other ports 86, thus ensuring the sealing of those ports and preventing the pressure from being dissipated into the other pressure source units $B_{1-3}$. As a result, although a large area is covered by the collective units $B_{1-3}$, those units therefore collectively having a very large internal volume, the operative pressure produced when a person steps on any one of those units is that corresponding to the restricted volume of that particular unit, thereby producing a high enough pressure to cause a reliable actuation of the system. Moreover, because of the operative isolation between individual units produced by the manifold H, it is possible for one of the units to leak or even be completely open to the atmosphere without affecting the functioning of the other units.

It will be noted that the strip 98, adjacent each of the ports 86, is provided with a weakened area 100. The purpose of this is to permit the strip 98 to break the seal at a given port if the pressure above the strip 98 should exceed the pressure below it by a predetermined value, such as a pressure equivalent to three inches of water. This action is desirable in order to promptly release any suction effects which might develop in a given source unit, the existence of which suction effect would prevent that particular unit from resuming a condition ready for renewed actuation.

In some instances, as where a large number of people stand on the entry mat B at the same time, or if a heavy package with a wide bottom surface is placed upon the entry mat B, a very high pressure is developed therein, and that pressure, communicated to the cylinder 2 of the first piston-cylinder assembly B, urges the piston 6 thereof to move toward the open end of the cylinder with considerable force. The greater this force, the greater is the tendency for the arm 14' of the embodiment of FIG. 8, for example, to move to its switch-closing position, causing the door to open. When someone is standing on the exit mat C the piston rod 40 of the piston-cylinder assembly G acts to prevent the arm 14' from thus moving, but when excessive forces are present a tendency has been noted for the arm 14' to force itself past the position in which the piston rod 40 tends to retain it. Even where actual short circuiting of the safety feature produced by the action of the piston-cylinder assembly G is not actually accomplished, the forces exerted on the operative parts of the mechanism tend to create distortions which are undesirable.

It is to eliminate these undesirable effects that the embodiment of FIGS. 12–15 has been devised. It differs from the embodiment of FIG. 8 most importantly with regard to the nature of the connection between the piston rod 10 of the cylinder 2 and the pivotally mounted arm **14*a* is concerned. In the embodiment of FIG. 8 that connection is rigid, and hence such forces as are developed within the cylinder 2 in the embodiment of FIG. 8 are transmitted directly to the arm 14' and are correspondingly directly exerted by the part 52' against the piston rod 40 when the latter is in its position shown in FIG. 8. In the embodiment of FIGS. 12–15, by way of contrast, the arm 14*a* is not rigidly connected to the piston rod 10. Instead the arm 14*a* is pivotally mounted on a stud 66*a* which extends up from the base plate 60', the piston rod 12 from the piston 4 being pivotally connected thereto at 20' and the part 52' extending therefrom into the path of movement of the piston rod 40, all as also shown in the embodiment of FIG. 8. The arm 14*a* has an upwardly extending part 109 and a spring connector generally designated 110 is mounted thereon, that spring connector 110 having a helical portion 112 loosely received over the upwardly extending part 109 and having arms 114 and 116 extending out therefrom. The arm 114 is pivotally connected, at 22*a*, to the end of the piston rod 10. The arm 116 extends under the laterally extending portion of the arm 14*a*, and engages a ledge 117 formed thereon, that ledge being positioned radially spaced from the axis of rotation of the arm 14*a*. That portion of the arm 14*a* to which the piston rod 12 is connected, at 20', has its undersurface 118 located above the undersurface 120 of the adjacent portion of the laterally extending part of the arm 14*a*, thereby to provide for clearance between the spring arm 116 and the piston rod 12 and the connection of that piston rod to the arm 14*a***.

In operation the pressure developed in the cylinder 2, as derived from the entry mat B, will be transmitted to the arm **14*a* via the spring 110. If the movement of the arm 14*a* should be prevented by the piston rod 40 engaging the part 52*a* carried by the arm 14*a*, any possibly excessive pressures developed in the cylinder 2 will be taken up by bending of the spring 110**. Thus the action of the exit mat C in preventing the door from opening when a person or thing is on that exit mat will be reliably effective even when exceptionally high pressures are developed in the entry mat B, and damage to or distortion of other parts of the device is likewise prevented.

The arrangement of FIGS. 12–15 has the additional advantage that when a sudden negative pressure of appreciable magnitude is developed in the entry mat B, as when a large number of people quickly move off from that mat or a heavy box is lifted therefrom, the timing action of the control mechanism will not be adversely affected. The negative pressure will tend to pull the piston 6 within the cylinder 2 rapidly toward the cylinder end wall **2*a*. In the embodiment of FIGS. 12–15 the piston 6 is free to move in that fashion without exerting any comparable pull on the arm 14*a*. The spring 110 is not positively connected to the arm 14*a*, and its arm 116 is free to move away from the abutment 117 on the arm 14*a* in response to rapid movement of the piston 6, the arm 14*a* subsequently catching up with the spring arm 116** in the course of its normal operation.

On problem which arises with pressure-sensitive fluid systems of the type here under discussion derives from changes in temperature which act upon the fluid employed to cause pressure changes. Ordinarily temperature changes are sufficiently gradual, and their effect on pressure sufficiently attentuated, that such pressure increases as they produce in the system leak off virtually as fast as they are produced, thus preventing a pressure build-up in the system sufficient to actuate the pressure-sensitive assembly F. The inherent leakage between the piston and the cylinder of each pressure-sensitive assembly is usually sufficient to take care of such pressure changes as are attendant upon normal ambient temperature changes. However, sometimes a pressure source may be subjected to a rather rapid and extreme temperature change. For example, when a mat is located outside a building, the sun is hot, and the mat is shaded by a cloud, and when the cloud moves away so as to suddenly subject the mat to the direct rays of the sun, the mat may heat up sufficiently rapidly so as to cause an appreciable pressure to build up within the mat faster than it can leak off, thereby simulating the condition resulting from a person stepping on the mat, and as a result the door or other controlled device will be caused to open unnecessarily.

The embodiment of FIGS. 16 and 17 is designed to eliminate that undesirable effect. To that end a special valve-controlled venting means, generally designated 130, is included in the fluid communication to the cylinder 2 of the pressure-sensitive assembly F, this venting means being sensitive to the pressure differential between the pressure at the exhaust area into which it empties and the pressure active within the cylinder 2. So long as that pressure differential is negative, zero, or less than a predetermined small value the venting means remains open, thus ensuring that such slow changes in pressure as may be developed by temperature variations will leak off before they can build up sufficiently to actuate the pressure-sensitive assembly F. On the other hand, when the pressure applied within the cylinder 2 increases rapidly, as will be the case when, for example, a person steps on the entry mat B, that large increase in pressure will cause the venting means to close, thereby enabling that large pressure increase to act upon the piston 6 in designed fashion. This valve controlled vent has the further advantage of taking care of that situation which arises when a negative pressure is developed in a mat. Such a negative pressure, active on the valve means controlling the venting means, ensures that the venting means remains open, thus permitting fluid to enter the system through the venting means to neutralize the negative pressure. It will be recalled that in the previously described embodiments this suction-eliminating effect was produced by the bypass provided through the piston 6; when the valve-controlled venting means of the present embodiment is employed, that piston bypass can be eliminated, and a more conventional connection between the piston 6 and its piston rod 10 may be employed.

As disclosed in FIGS. 16 and 17, the valve controlled venting means generally designated 130 is built into the pressure-sensitive assembly F, and more specifically is incorporated into the cylinder 2 thereof. The end wall 2a of the cylinder 2 is provided with an outwardly extending part **2*b* which is externally threaded at 132, and which is provided with one or more vertically extending grooves 134 which interrupt the threads 132. The part 2*b* has a central passage 136 which leads into the interior of the cylinder 2. A valve seat assembly, generally designated 138, comprises an axially extending portion 140 and a laterally extending portion 142, the former being provided with a wide axial passage 144 and the latter being provided with one or more radially outwardly located through apertures 146. The valve seat assembly 138 is received within the passage 136 in the cylinder part 2*b*, its tip 148 engaging the part 2*b* in such a manner that its laterally extending portion 142 is positioned above the end surface 150 of the cylinder part 2*b*, a laterally extending passage 152 thus being defined there which communicates with the passage 134. A flexible valve generally designated 154, and formed of some suitable material such as silicone rubber, has a central hub portion 156 which is received within the upper end of the passage 144 and which has a wide axial passage 157, and is further provided with an outwardly extending flange portion 158 which extends out over the upper surface 160 of the valve seat portion 142 to a location radially beyond the apertures 146, there preferably being provided with a downwardly extending lip 162. As may clearly be seen from FIGS. 16 and 17, the valve 154 is so designed that in its normal condition its flange portion 158, and the downwardly extending lip 162, are spaced above the surface 160**.

A valve body generally designated 164 has an internally threaded portion 166 which is received over the threaded portion 132 of the cylinder part **2*b*, preferably clamping between itself and the cylinder end wall 2*a* a supporting chassis wall 60*a*, thereby to mount the cylinder 2 thereon. The valve body 164 has an internal ledge 168 which engages the valve seat assembly 138 and holds it in position, and it is further provided with an upstanding nipple portion 170 having an axial passage 172 therethrough, the fluid communication tube 32 from the fluid source B being adapted to be received over the nipple portion 170**.

FIG. 16 illustrates the normal condition of the valve controlled venting means 130. As indicated by the arrow 174, the passage 172 communicates directly with the interior of the cylinder 2 via the passages 157 and 144. As indicated by the arrows 176, 178 and 180, the passage 172 also communicates, via the vent apertures 146, with the outside atmosphere. The outwardly extending flexible portion 158 of the valve 154 has its upper surface acted upon essentially by the pressure existing in the passage 172 (which will in turn correspond to the pressure in the pressure source such as the entry mat B with which the passage 172 is in fluid communication), and has its lower surface acted upon by the exhaust pressure in the exhaust area with which the passage 134 communicates at its lower end.

If now in a given short period of time there should be a slight increase in pressure in the passage 172, that pressure, acting upon the upper surface of the valve part 158, will tend to move that part downwardly. However, the pressure will tend to equalize on the lower surface of the valve part 158 by following the path of arrow 176, and if the pressure buildup is sufficiently slow the valve part 158 will remain in its position illustrated in FIG. 16, with such pressure increases as may develop slowly venting themselves along the path indicated by the arrows 176, 178 and 180 as fast as they appear. There will thus be no pressure buildup within the system.

If, however, the pressure increase in the passage 172 should be more rapid, so that it will act to move the valve part down until its lip 162 engages the surface 160, thus blocking access to the vent apertures 146, then the venting means 130 will be closed, as illustrated in FIG. 17. Hence the rapidly increased pressure in the passage 172 will, as indicated by the arrow 174, be transmitted to the interior of the cylinder 2, where it can operatively act upon the piston 6. Thus the venting system 130 permits slow increases in pressure to be vented without actuating the pressure-sensitive assembly F, while enabling more rapid pressure increases to be rendered fully operative on the pressure-sensitive assembly F.

If a negative pressure is developed in the mat B, for example, the pressure in the passage 172 will become less than that in the surrounding atmosphere. Under these circumstances the pressure on the underside of the outwardly extending valve portion 158 will exceed that on its upper side and that valve portion 158 will be forced upwardly, thereby positively ensuring that the vent apertures 146 are opened, and, indeed, enlarging the spaces around the valve portion 158 through which pressureequalizing fluid flow may take place. As a result air from the surrounding atmosphere can flow into the system through the path defined by the arrows 176, 178 and 180 of FIG. 16, but in the opposite direction from that in which those arrows are oriented, thereby rapidly relieving the vacuum and preventing that vacuum from exerting any appreciable pull on the piston 6 within the cylinder 2.

The system of the present invention, it will be seen, is capable of reliable and sensitive control through fluid actuation. The parts involved are mechanically sturdy and hence reliable, yet they are relatively inexpensive when compared with the electrical mat units previously used for this purpose. The system is insensitive to ambient changes in temperature and pressure, is unaffected by rain, snow and moisture, yet is capable of causing doors or the like to open in response to the application of the weight of a child on a mat.

While but a limited number of embodiments of the present invention have been here specifically disclosed, it will be apparent that many variations may be made therein, all within the scope of the instant invention as defined in the following claims.

We claim:

1. In a system for controlling the operation of a device in accordance with pressure exerted on first and second fluid sources, the improvement which comprises a first pressure-sensitive assembly having a part capable of moving rapidly in one direction and slowly in the other direction between operative positions, biasing means active on said part for causing it to move it said other direction, first fluid connection means between said first source and said part for causing said part to move in said one direction when pressure is produced in said first source, a member operatively connected to said device for controlling the operation thereof, an operative connection between said part and said member for actuating the latter in accordance with the operative position of the former, control means operatively connected to said part and effective when actuated to prevent operative movement of said part out of its then existing operative position, and second fluid connection means between said second source and said control means for actuating the latter when pressure is produced in said second source.

2. The system of claim 1, in which said control means is mechanically operative on said part of said first assembly.

3. The system of claim 1, in which said control means is fluid-operative on said part of said first assembly.

4. The system of claim 1, in which said control means comprises a normally open valve in said first fluid connection, said second fluid connection means being operative on said valve to close the latter when said pressure is produced in said second source.

5. The system of claim 1, in which said first pressure-sensitive assembly comprises first and second containers having end walls, said first fluid connection means passing through the end wall of said first container, an adjustable leakage valve passing through the end wall of said second container, first and second parts in said containers respectively, and a mechanical connection between said parts, said mechanical connection comprising, at said second part, a bypass valve through said part which is open when said part and said connection push against one another and which is closed when said part and said connection pull against one another.

6. The system of claim 1, in which said control means comprises a second pressure-sensitive assembly comprising a container and a movable part to the container of which said second fluid connection means communicates, said part of said second assembly being movable between actuated and deactuated positions in response to whether or not said second fluid connection means applies pressure to its associated container, said part of said second assembly being operatively connected to said part of said first assembly.

7. The system of claim 6, in which the operative connection between said parts of said first and second assemblies is mechanically operative on said part of said first assembly.

8. The system of claim 6, in which the operative connection between said parts of said first and second assemblies comprises an element movable with said part of said second assembly as said control means is respectively actuated and deactuated into and out from the path of travel of an element operatively connected to said part of said first assembly, thereby to mechanically prevent movement of said part of said first assembly from one of its operative positions to the other.

9. The system of claim 6, in which the operative connection between said parts of said first and second assemblies is fluid-operative on said part of said first assembly.

10. The system of claim 6, in which the operative connection between said parts of said first and second assemblies comprises a normally open valve in said first fluid connection means, said part of said second assembly when in its actuated position closing said valve.

11. The system of claim 6, in which said second assembly has a quick-resetting characteristic such that it returns promptly from actuated to de-actuated position when pressure is released from its cylinder.

12. The system of claim 6, in which said first fluid connection means passes through the container of said second assembly, said part of said second assembly interrupting said first fluid connection means when said part is in actuated position and establishing the continuity of said first fluid connection means when said part is in de-actuated condition.

13. The system of claim 6, in which said operative connection between said parts of said first and second assemblies comprises a first element operatively connected to said part of said first assembly and movable therewith along a given path, a second element operatively connected to said part of said second assembly and movable therewith, biasing means active on said second element in a sense to urge said part of said second assembly to its de-actuated position, said second element, when said part of said second assembly is in its actuated position, being moved to intersect the path of movement of said first element at a point such as to prevent said part of said first assembly from moving from either of its operative positions to the other.

14. The system of claim 1, in which one of said fluid sources comprises a plurality of independent source units, said fluid connection means associated with said one of said sources comprising a manifold comprising a housing having a plurality of inputs in fluid communication with said independent units respectively and having an output in fluid communication with the pressure-sensitive assembly associated therewith, said housing having an interior chamber communicating with said output, said chamber having a plurality of aligned ports opening thereinto, said inputs being in fluid connection with said ports respectively, and a plastic strip in said chamber, extending over, resting on, and normally closing said ports, said strip being adapted to lift from a given port when pressure is exerted within said port, thereby to permit said pressure to pass to said output.

15. The system of claim 1, in which one of said fluid sources comprises a plurality of independent source units, said fluid connection means associated with said one of said sources comprising a manifold comprising a housing having a plurality of inputs in fluid communication with said independent units respectively and having an output in fluid communication with the pressure-sensitive assembly associated therewith, said housing having an interior chamber communicating with said output, said chamber having a plurality of aligned ports opening thereinto, said inputs being in fluid connection with said ports respectively, and a plastic strip in said chamber, extending over, resting on, and normally closing said ports, said strip being adapted to lift from a given port when pressure is exerted within said port, thereby to permit said pressure to pass to said output, the body of said strip adjacent each port being weakened, whereby an increase in pressure in said chamber beyond a predetermined value acts on said strip to unseal a port and permit said pressure to vent itself through the input associated with said port.

16. The system of claim 1, in which said first assembly has a fluid bypass around its said part, said bypass comprising a normally closed valve, and valve control means operatively connected to said valve to open the same upon the existence of a suction effect in said first source.

17. The system of claim 1, in which said part of said first assembly has a bypass therethrough, said bypass comprising a valve element movable between valve-open and valve-closed positions, the operative connection between said part and said device-controlling member including said valve element, and means for limiting the movement of said operative connection in said other direction while permitting said part further movement in said other direction after movement of said operative connection has been terminated, said additional movement of said part in said other direction relative to said operative connection being effective to move said valve element to valve-open position.

18. The system of claim 1, in which said operative connection between said part of said first assembly and said member is resiliently yieldable.

19. The system of claim 18, in which said control means is mechanically operative on said part of said first assembly.

20. The system of claim 18, in which said first pressure-sensitive assembly comprises first and second containers having end walls, said first fluid connection means passing through the end wall of said first container, an adjustable leakage valve passing through the end wall of said second container, first and second parts in said containers respectively, and a mechanical connection between said parts, said mechanical connection comprising, at said second part, a bypass valve through said part which is open when said part and said connection push against one another and which is closed when said part and said connection pull against one another.

21. The system of claim 18, in which said control means comprises a second pressure-sensitive assembly comprising a container and a movable part to the container of which said second fluid connection means communicates, said part of said second assembly being movable between actuated and deactuated positions in response to whether or not said second fluid connection means applies pressure to its associated container, said part of said second assembly being operatively connected to said part of said first assembly.

22. The system of claim 21, in which the operative connection between said parts of said first and second assemblies comprises an element movable with said part of said second assembly as said control means is respectively actuated and deactuated into and out from the path of travel of an element operatively connected to said part of said first assembly, thereby to mechanically prevent movement of said part of said first assembly from one of its operative positions to the other.

23. The system of claim 21, in which said operative connection between said parts of said first and second assemblies comprises a first element operatively connected to the part of said first assembly and movable therewith along a given path, a second element operatively connected to the part of said second assembly and movable therewith, biasing means active on said second element in a sense to urge said part of said second assembly to its deactuated position, said second element, when said part of said second assembly is in its actuated position, being moved to intersect the path of movement of said first element at a point such as to prevent said part of said first assembly from moving from either of its operative positions to the other.

24. The system of claim 1, in which said operative connection between said part of said first assembly and said member comprises a spring means, one of said member and said part comprising an abutment, said spring means being resiliently operatively urged against said abutment.

25. The system of claim 24, in which said control means is mechanically operative on said part of said first assembly.

26. The system of claim 24, in which said first pressure-sensitive assembly comprises first and second containers having end walls, said first fluid connection means passing through the end wall of said first container, an adjustable leakage valve passing through the end wall of said second container, first and second parts in said cylinders respectively, and a mechanical connection between said parts, said mechanical connection comprising, at said second part, a bypass valve through said part which is open when said part and said connection push against one another and which is closed when said part and said connection pull against one another.

27. The system of claim 24, in which said control means comprises a second pressure-sensitive assembly comprising a container and a movable part to the container of which said second fluid connection means communicates, said part of said second assembly being movable between actuated and deactuated positions in response to whether or not said second fluid connection means applies pressure to its associated cylinder, said part of said second assembly being operatively connected to said part of said first assembly.

28. The system of claim 27, in which the operative connection between said parts of said first and second assemblies comprises an element movable with said part of said second assembly as said control means is respectively actuated and deactuated into and out from the path of travel of an element operatively connected to said part of said first assembly, thereby to mechanically prevent movement of said part of said first assembly from one of its operative positions to the other.

29. The system of claim 27, in which said operative connection between said parts of said first and second assemblies comprises a first element operatively connected to said part of said first assembly and movable therewith along a given path, a second element operatively connected to said part of said second assembly and movable therewith, biasing means active on said second element in a sense to urge said part of said second assembly to its deactuated position, said second element, when said part of said second assembly is in its actuated position, being moved to intersect the path of movement of said first element at a point such as to prevent said part of said first assembly from moving from either of its operative positions to the other.

30. The system of claim 1, in which said first fluid connection means comprises a vent between said first source and exhaust and pressure-sensitive valve means controlling said vent and effective to cause said vent to be open except when the pressure in said first source exceeds that in said exhaust by a predetermined amount.

31. The system of claim 30, in which said valve means positively assures that said vent is open when the pressure in said first source is less than that in said exhaust.

32. The system of claim 30, in which said vent and valve means comprise a body having a first passage communicating between said first source and said first piston and having a second passage communicating between said first source and said exhaust, and a valve member mounted on said body so as to operatively overlie said second passage, be movable toward and away from said second passage, be exposed to the pressure in said first source on the side thereof away from said second passage, be exposed to the pressure in said exhaust on the side thereof directed toward said second passage, normally be spaced from said second passage to expose the same, and be movable into sealing relation with said second passage upon the exertion of pressure thereon from said first source against the action of pressure thereon from said exhaust via said second passage.

33. In a system for controlling the operation of a device in accordance with pressure exerted on a fluid source which comprises a pressure-sensitive assembly having a part capable of moving in a given direction and fluid connection means including an exhaust between said source and said part for causing said part to move in said given direction when pressure is produced in said source; the improvement which comprises said fluid connection comprising a vent between said source and exhaust and valve means controlling said vent and effective to cause said vent to be open except when the pressure in said source exceeds that in said exhaust by a predetermined amount, in which said vent and valve means comprise a body having a first passage communicating between said source and said first piston and having a second passage communicating between said source and said exhaust, and a valve member mounted on said body so as to operatively overlie said second passage, be movable toward and away from said second passage, be exposed to the pressure in said exhaust on the side thereof directed toward said second passage, normally be spaced from said second passage to expose the same, and be movable into sealing relation with said second passage upon the exertion of pressure thereon from said source against the action of pressure thereon from said exhaust via said second passage.

References Cited

UNITED STATES PATENTS

| | | | |
|---|---|---|---|
| 2,624,569 | 1/1953 | Peterson | 49—264 |
| 2,903,854 | 9/1959 | Harty | 60—54.5 |
| 3,349,559 | 10/1967 | Gloor | 60—62.5 |

FOREIGN PATENTS

| | | |
|---|---|---|
| 22,825 | 10/1912 | Great Britain. |

MARTIN P. SCHWADRON, *Primary Examiner.*

ROBERT R. BUNEVICH, *Assistant Examiner.*